United States Patent Office 3,184,444
Patented May 18, 1965

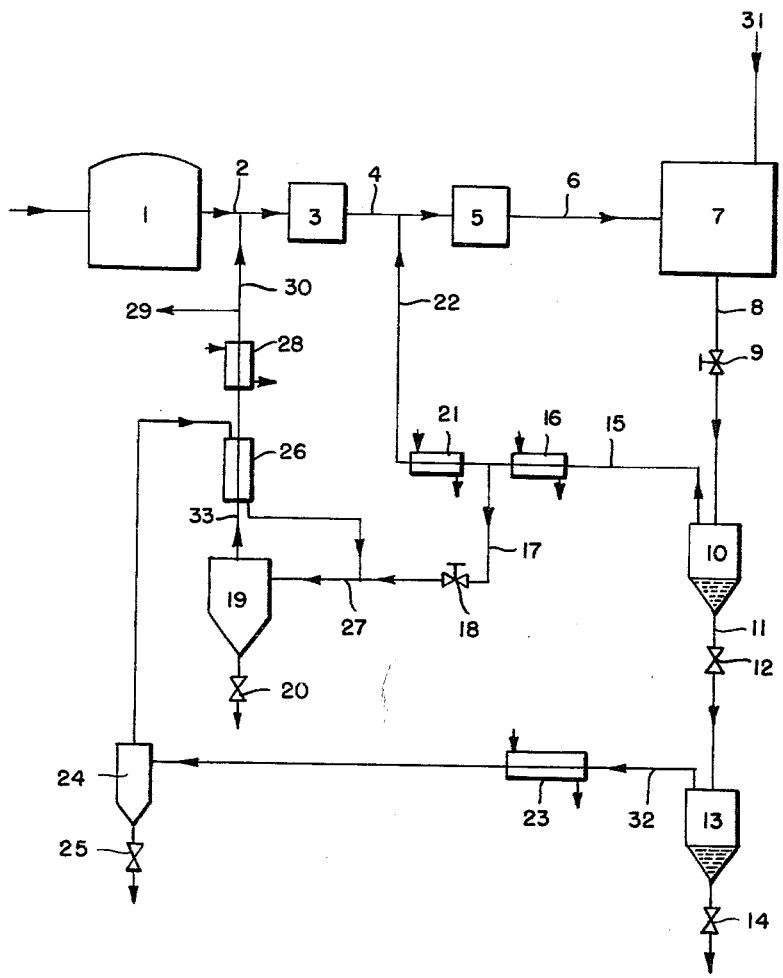

3,184,444
PROCESS FOR SEPARATION OF THE SOLVENTS FROM POLYETHYLENE FORMED IN HIGH-PRESSURE POLYMERIZATION OF ETHYLENE IN THE PRESENCE OF SOLVENTS AND FROM LOW-PRESSURE CIRCULATING GAS
Hans Eilbracht, Ludwigshafen (Rhine), Helmut Pfannmueller, Mannheim, Rudi-Heinz Rotzoll, Ludwigshafen (Rhine), Friedrich Urban, Limburgerhof, Pfalz, and Wieland Zacher, Ludwigshafen (Rhine), Germany, assignors to Badische Anilin- & Soda-Fabrik Aktiengesellschaft, Ludwigshafen (Rhine), Germany
Filed Dec. 4, 1961, Ser. No. 156,667
Claims priority, application Germany, Dec. 6, 1960, B 60,369
2 Claims. (Cl. 260—94.9)

This invention relates in general to a new and improved polymerization process in which the solvent used is separated. More specifically, the invention relates to a new and improved process for the separation of solvent used in the polymerization of ethylene from the polyethylene formed in the reaction and from the unreacted ethylene.

High-pressure polymerization of ethylene is carried out at pressures between 500 and 4000 atmospheres and at temperatures between 150° and 400° C. Oxygen or substances which yield oxygen and form free radicals are used singly or conjointly as catalysts in these known methods. Some of these substances are dissolved in solvents and the solutions added to the reaction gas. Polyethylene formed at a conversion rate of 10 to 20% by weight with reference to the feed is expanded together with the unreacted ethylene through an expansion valve into a high-pressure separator where it separates at a pressure of, for example, 250 atmospheres. The bulk of the unreacted ethylene at 250 atmospheres is recompressed to the reaction pressure and returned to the reactor. A smaller portion, namely about 50% by weight with reference to the polymer, is expanded as carrier gas together with the polymers into a separator operating at atmospheric pressure. After separating the polymer, the ethylene at atmospheric pressure is recompressed to the reaction pressure and returned to the reactor.

The solvent necessary for introducing the catalysts in dissolved condition accumulates in the high-pressure cycle in the said reaction system to a concentration dependent on the amount of recycle gas and the amount of solvent pumped in. This solvent promotes the flow of the polyethylene in the reaction system. When the polyethylene is expanded from the high-pressure separator into the atmospheric separator, however, the carrier gas entrains a certain amount of solvent. Some of this solvent is discharged with the polyethylene and must be removed from the same, and some separates either in the pipes leading to the compressor or in the compressor itself. Solvent which separates in the compressor may cause serious damage.

It is an object of this invention to provide a method for separating polyethylene and ethylene from the solvent. Another object of this invention is to expand the smallest possible amount of ethylene in order to keep the energy requirements for the subsequent compression of the ethylene to the reaction pressure as low as possible.

Another object of the invention is to substantially separate the solvent from the ethylene which is supplied to the compressors in order to avoid obstruction in the compressors caused by separation of solvent.

These objects are achieved by separating the polyethylene from the reaction mixture in a high-pressure separator at a pressure of more than 150 atmospheres, expanding it into a low-pressure separator while constantly maintaining a definite polyethylene level in the high-pressure separator, conveying the entrained residual ethylene together with the solvent from the low-pressure separator through a gas cooler into a third separator, substantially freeing them therein from solvent and supplying the ethylene at atmospheric pressure with the residual solvent in a countercurrent heat-exchanger, while cooling in a precooler the ethylene separated in the high-pressure separator together with the bulk of the solvent, separating it from the solvent, after partial expansion, in a low-temperature separator and returning it as low-pressure recycle gas through the said heat-exchanger and a further heat-exchanger to a precompressor, further cooling some of it in an after-cooler and leading it to an after-compressor.

The invention will now be described in detail with reference to the accompanying diagrammatic drawing.

Fresh ethylene from a gas holder 1 is supplied through a pipe 2 to a precompressor 3 and compressed to the pressure of the high-pressure recycle gas, for example 250 atmospheres. Thence the gas flows through a pipe 4 to an after-compressor 5 where it is compressed to the reaction pressure. The gas is then supplied through a pipe 6 to a reactor 7 and polymerized therein after addition of the catalyst dissolved in a solvent through a pipe 31. The reaction mixture consisting of polyethylene, unreacted ethylene and solvent is expanded into a high-pressure separator 10 through a pipe 8 and a relief valve 9. The polymer separates at the bottom of separator 10 while the unreacted ethylene with the solvent contained therein passes as high-pressure recycle gas through a pipe 15 to a precooler 16. After leaving precooler 16, part of the high-pressure recycle gas is cooled to about 30° C. in an after-cooler 21 and then led through a pipe 22 to pipe 4 in which it is mixed with fresh ethylene and then fed to after-compressor 5. After compression in compressor 5, the high-pressure recycle gas is supplied to reactor 7. The other part of the high-pressure recycle gas leaving precooler 16 is supplied through a pipe 17 to a regulating valve 18 and substantially expanded. The gas mixture then passes through a pipe 27 into a low-temperature separator 19. Solvent contained in the gas separates in separator 19 and is run off through a valve 20.

Gas from precooler 16 is advantageously cooled, prior to decompression by regulating valve 18, to a temperature such that after decompression it has a low temperature, for example of −50° to −30° C., in pipe 27 and low-temperature separator 19. This temperature is sufficiently low to ensure that the solvent separated can be blown out in liquid form or in the form of flakes through the regulating valve but not low enough for the depressured ethylene to liquefy. At such a temperature, so little solvent remaians in the ethylene that troublesome deposits cannot occur in the subsequent pipes and compressors.

Polyethylene at a temperature of about 180° to 200° C. separating in high-pressure separator 10 is expanded through a pipe 11 and a relief valve 12 into a low-pressure separator 13. A definite level of fused polyethylene is always maintained in high-pressure separator 10 and any breakthrough of high-pressure recycle gas with its content of solvent into the separator 13 is thus prevented. During conveyance through relief valve 12, the polyethylene entrains ethylene which at 250 atmospheres is dissolved therein (about 20% by weight with reference to the polymer) into low-pressure separator 13. This gas becomes disengaged from the polyethylene in separator 13 and escapes at about 150° C. through a pipe 32. The effluent gas entrains with it the remainder of the solvent which has passed with the polyethylene into separator 13 so that polyethylene can be discharged through a valve 14 without troublesome solvent. The solvent-containing residual gas which is at atmospheric pressure is cooled with water to about 30° C. in a cooler 23. The solvent separated from the gas by cooling is collected in a separator 24 and discharged through a valve 25. After leaving separator 24, the gas is cooled to a low temperature in a heat-exchanger 26 by flowing countercurrent to the gas from low-temperature separator 19 and is united in a pipe 27 with the gas decompressed through regulating valve 18.

The gas at atmospheric pressure is thus cooled to an adequate extent and freed from solvent. The combined gas stream leaves low-temperature separator 19 through a pipe 33, flows through a heat-exchanger 26, in which it absorbs part of the heat of the gas coming from separator 24, and is heated to about 20° C. in a further heat-exchanger 28. The combined gas stream then passes, after a definite amount of gas has been withdrawn at 29, through a pipe 30 to precompressor 3 and through pipe 4 to after-compressor 5. Under the reaction pressure the gas is supplied to reactor 7.

It is advantageous to use for heating the gas in heat-exchanger 28 the water which has been heated by cooling the various gas streams in coolers 16, 21 and 23.

To ensure substantial separation, such as temperature is set up in the high-pressure recycle gas prior to expansion of the partial gas stream that the gas on the low-pressure side of the relief valve has a temperature below 0° C. but above the liquefaction temperature of ethylene.

The ethylene set free by expansion of the polyethylene from the high-pressure separator into the low-pressure separator is united with the stream of ethylene expanded direct from the high-pressure cycle.

The ethylene set free by expansion of the polyethylene from the high-pressure separator into the low-pressure separator is precooled with water and then further precooled in a heat-exchanger in countercurrent with the direct expanded ethylene from the high-pressure separator prior to being united with the ethylene expanded direct from the high-pressure cycle.

By the process according to this invention, the polyethylene is freed from solvent and ethylene, and the gaseous ethylene supplied to the compressors is substantially free from solvent. Deposits in the compressors are thus avoided so that it is possible to prolong the period of operation of the compressors, whereas otherwise it would be necessary to stop the compressors and clean them at short and regular intervals to remove deposits.

We claim:

1. A two stage process for removing solvent from polyethylene formed in the continuous high-pressure polymerization of ethylene at a temperature of between 150 and 400° C. and pressures of between 500 and 4000 atmospheres which comprises: passing the reaction mixture from the reaction vessel to a high-pressure separator held at a pressure of more than 150 atmospheres, said reaction mixture containing polyethylene, ethylene, and solvent, maintaining a predetermined level of polyethylene in said high-pressure separator, removing the bulk of the ethylene and solvent from the reaction mixture in said high-pressure separator and passing said ethylene and said solvent into a high-pressure gas cycle held at a pressure greater than 100 atmospheres; expanding said polyethylene from said high-pressure separator into a low-pressure separator, removing ethylene entrained by the polyethylene in dissolved form from the polyethylene together with solvent and passing said ethylene and said solvent into a low-pressure gas cycle, said polyethylene thereafter being removed in purified form from said low-pressure separator, said ethylene and said solvent in said low-pressure cycle passing to a gas cooler and into an atmospheric separator; separating the bulk of the solvent from said ethylene in said atmospheric separator, and cooling the residual gas consisting of ethylene and residual solvent in a countercurrent heat exchanger; passing said bulk of said ethylene and said solvent from said high-pressure separator in said high-pressure gas cycle to a cooler, further cooling the bulk of the ethylene from said cooler and passing said ethylene in said high-pressure cycle to a compressor where it is compressed to reaction pressure and passed once again to the reaction vessel; further cooling the residual ethylene and solvent in said high-pressure gas cycle and expanding said residual gas and solvent; mixing the gases including residual solvent from the low-pressure cycle with the gases including solvent from the high pressure cycle after the gases of the high pressure cycle have been expanded and passing said mixture of said gases and solvents to a low temperature separator wherein the solvent and gas are separated; passing separated gas from said low temperature separator into the countercurrent heat exchanger; and passing said separated gas to a precompressor and aftercompressor and then again to the reaction vessel.

2. A process as in claim 1 wherein the temperature of the gas in the atmospheric separator is below 0° C. but above the liquefaction temperature of ethylene.

References Cited by the Examiner
UNITED STATES PATENTS
2,728,753  12/55  Russum et al. _____ 260—94.9

JOSEPH L. SCHOFER, *Primary Examiner.*

WILLIAM H. SHORT, *Examiner.*